US012482429B2

(12) United States Patent
Lee

(10) Patent No.: US 12,482,429 B2
(45) Date of Patent: Nov. 25, 2025

(54) GATE DRIVING CIRCUIT AND DISPLAY APPARATUS INCLUDING THE SAME

(71) Applicant: LG Display Co., Ltd., Seoul (KR)

(72) Inventor: Sung Jin Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/806,450

(22) Filed: Aug. 15, 2024

(65) Prior Publication Data

US 2025/0218388 A1 Jul. 3, 2025

(30) Foreign Application Priority Data

Dec. 28, 2023 (KR) ........................ 10-2023-0195250

(51) Int. Cl.
*G09G 3/3266* (2016.01)
*G09G 3/20* (2006.01)
*G09G 3/3233* (2016.01)

(52) U.S. Cl.
CPC ......... *G09G 3/3266* (2013.01); *G09G 3/2092* (2013.01); *G09G 3/3233* (2013.01); *G09G 2300/0842* (2013.01); *G09G 2310/08* (2013.01)

(58) Field of Classification Search
None
See application file for complete search history.

(56) References Cited

U.S. PATENT DOCUMENTS

2011/0157263 A1* 6/2011 Kim ..................... G09G 3/3677 345/698
2019/0066604 A1* 2/2019 Kong ................... G09G 3/3291
2021/0335200 A1* 10/2021 Yuan .................... G09G 3/3677

* cited by examiner

*Primary Examiner* — Kirk W Hermann
(74) *Attorney, Agent, or Firm* — Seed Intellectual Property Law Group LLP

(57) ABSTRACT

A gate driving circuit includes a Q-node controller configured to control a voltage of a Q-node by first and second clock signals and a start signal or an output signal of an upstream stage, a QB-node controller configured to control a voltage of a QB-node by the second clock signal, a pull-up transistor configured to pull-up drive a logic output terminal in response to the voltage of the Q-node, a pull-down transistor configured to pull-down drive the logic output terminal in response to the voltage of the QB-node, a first inverter transistor configured to supply a gate-low voltage to an output terminal in response to the first clock signal, and a second inverter transistor configured to supply a gate-high voltage to the output terminal in response to a voltage of the logic output terminal.

19 Claims, 10 Drawing Sheets

GATE DRIVING CIRCUIT AND DISPLAY APPARATUS INCLUDING THE SAME

CROSS-REFERENCE TO RELATED APPLICATION(S)

This application claims the benefit of Korean Patent Application No. 10-2023-0195250, filed on Dec. 28, 2023, which is hereby incorporated by reference as if fully set forth herein.

BACKGROUND

Technical Field

The present disclosure relates to a display apparatus, and more particularly to a gate driving circuit and a display apparatus using the same.

Description of the Related Art

Image display apparatuses, which render a variety of information on a screen, are core technologies of the information communication age, and are being developed toward further thinness, further lightness, portability, and higher performance. As such, display apparatuses, which may be manufactured to have a light and thin structure, are being highlighted.

Such a display apparatus is self-luminous and, as such, is not only advantageous in terms of power consumption according to low-voltage driving, but also has fast response time, high luminous efficacy, wide viewing angle, and high contrast ratio. In this regard, such a display apparatus is being highlighted as a next-generation display apparatus and research thereon is being conducted.

As concrete examples of such a display apparatus, there are a liquid crystal display (LCD) apparatus, a quantum dot display (QD) apparatus, a field emission display (FED) apparatus, an organic light emitting display (OLED) apparatus, etc.

The display apparatus includes a panel configured to display an image through pixels disposed in the form of a matrix at intersections of a plurality of gate lines and a plurality of data lines, and a driving circuit configured to drive the panel.

The driving circuit includes a gate driver and a data driver. The gate driver sequentially drives the plurality of gate lines, and the data driver supplies a data voltage to the plurality of data lines.

The gate driver includes a plurality of stages configured to sequentially drive the plurality of gate lines.

Each stage of the gate driving circuit includes a set node, a reset node, a node controller configured to control voltages of the set node and the reset node, and a buffer configured to output a scan signal to a corresponding one of the gate lines in accordance with voltages of the set node and the reset node. Each stage outputs one or two scan signals per frame.

However, among thin film transistors constituting each stage, a thin film transistor configured to be maintained at a low voltage level during an emission period may have a possibility of generation of positive bias temperature stress (PBTS) due to a continuous turn-on state thereof. Due to such PBTS, the gate driving circuit may generate driving failure. As a result, reliability of the gate driving circuit may be degraded.

BRIEF SUMMARY

The present disclosure is directed to a gate driving circuit and a display apparatus including the same that, among others, substantially obviate one or more problems due to limitations and disadvantages of the related art.

The present disclosure provides a gate driving circuit capable of eliminating positive bias temperature stress (PBTS) through repeated turning on/off of a transistor configured to be continuously turned on in an emission period, thereby achieving an enhancement in reliability thereof, and a display apparatus including the gate driving circuit.

Technical features of the present disclosure are not limited to those described above, and other technical features and improvements of the present disclosure not yet described will be more clearly understood by those skilled in the art from the following detailed description.

As embodied and broadly described herein, a gate driving circuit includes a Q-node controller configured to control a voltage of a Q-node by first and second clock signals and a start signal or an output signal of an upstream stage, a QB-node controller configured to control a voltage of a QB-node by the second clock signal, a pull-up transistor configured to pull-up drive a logic output terminal in response to the voltage of the Q-node, a pull-down transistor configured to pull-down drive the logic output terminal in response to the voltage of the QB-node, a first inverter transistor configured to supply a gate-low voltage to an output terminal in response to the first clock signal, and a second inverter transistor configured to supply a gate-high voltage to the output terminal in response to a voltage of the logic output terminal.

Concrete matters of other aspects of the present disclosure are included in the following detailed description of the present disclosure and the accompanying drawings.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and along with the description serve to explain the principle of the disclosure. In the drawings.

DETAILED DESCRIPTION

Figure 1:
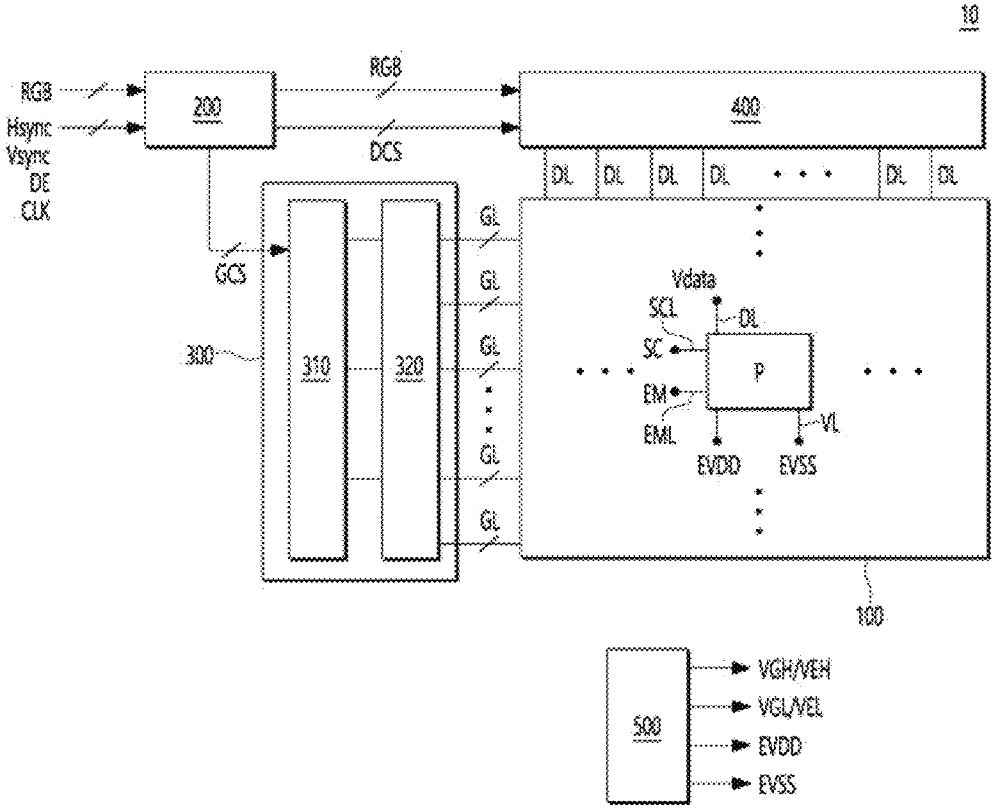
FIG. 1 is a block diagram schematically showing a display apparatus according to an exemplary embodiment of the present disclosure.

Hereinafter, example embodiments of the present disclosure will be described in detail with reference to the accompanying drawings. In the description given with reference to the accompanying drawings, the same reference numerals designate the same constituent elements, respectively. In the following description of the present disclosure, a detailed description of known functions and configurations incorporated herein will be omitted when it may obscure the subject matter of the present disclosure. Furthermore, the following terms associated with constituent elements are selected taking into consideration easy preparation of the disclosure, and may differ from the names of the corresponding elements in practice.

The shape, size, ratio, angle, number and the like shown in the drawings to illustrate the embodiments of the present disclosure are only for illustration and are not limited to the contents shown in the drawings. Wherever possible, the same reference numbers will be used throughout the drawings to refer to the same or like parts. In the following description, detailed descriptions of technologies or configurations related to the present disclosure may be omitted so as not to unnecessarily obscure the subject matter of the present disclosure. When terms such as "including," "having" and "comprising" are used throughout the specification, an additional component may be present, unless "only" is used. A component described in a singular form encompasses components in a plural form unless particularly stated otherwise.

It should be interpreted that the components included in the embodiment of the present disclosure include an error range, although there is no additional particular description thereof.

In describing a variety of embodiments of the present disclosure, when terms for positional relationship such as "on," "above," "under" and "next to" are used, at least one intervening element may be present between two elements unless "right" or "direct" is used.

In describing a variety of embodiments of the present disclosure, when a temporal relationship is described, for example, when terms for temporal relationship of events such as "after," "subsequently," "next," and "before" are used, there may also be the case in which the events are not continuous, unless "immediately" or "directly" is used.

In the meantime, although terms including an ordinal number, such as first or second, may be used to describe a variety of constituent elements, the constituent elements are not limited to the terms, and the terms are used only for the purpose of discriminating one constituent element from other constituent elements.

The respective features of various embodiments according to the present disclosure can be partially or entirely joined or combined and technically variably related or operated, and the embodiments can be implemented independently or in combination.

Hereinafter, a gate driving circuit according to an embodiment of the present disclosure and a display apparatus including the same will be described with reference to the accompanying drawings.

FIG. 1 is a block diagram schematically showing a display apparatus according to an embodiment of the present disclosure.

Figure 2:
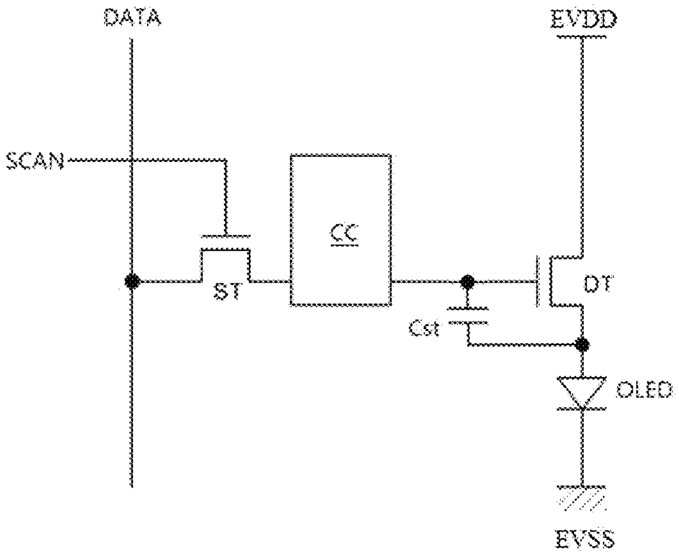
FIG. 2 is a circuit diagram of a pixel included in the display apparatus according to the exemplary embodiment of the present disclosure.

FIG. 2 is a circuit diagram of a pixel included in the display apparatus according to the embodiment of the present disclosure.

As shown in FIG. 1, the display apparatus, which is designated by reference numeral "10," includes a display panel 100 including a plurality of pixels P, a controller 200, a gate driving circuit 300 configured to supply a gate signal to each of the plurality of pixels P, a data driving circuit 400 configured to supply a data signal (or a data voltage) to each of the plurality of pixels P, and a power supply 500 configured to supply electric power to each of the plurality of pixels P, for driving of each of the plurality of pixels P.

The display panel 100 includes an active area (AA) in which the pixels P are disposed, and a non-active area (NA) disposed to surround the active area (AA). In the non-active area (NA), the gate driving circuit 300 and the data driving circuit 400 are disposed.

A plurality of gate lines GL and a plurality of data lines DL intersect each other at the display panel 100, and each of the plurality of pixels P is connected to corresponding ones of the gate lines GL and the data lines DL. In detail, each pixel P receives a gate signal from the gate driving circuit 300 through the corresponding gate line GL, receives a data signal from the data driving circuit 400 through the corresponding data line DL, and receives a high-level drive voltage EVDD and a low-level drive voltage EVSS from the power supply 500.

Each gate line GL supplies a scan signal SC and an emission control signal EM to a plurality of pixels P, and each data line DL supplies a data voltage Vdata to a plurality of pixels P. In accordance with various embodiments, each gate line GL may include a plurality of scan lines SCL for supply of the scan signal SC, and a plurality of emission control signal lines EML for supply of the emission control signal EM.

As shown in FIG. 2, each pixel P may include a switching transistor ST, a driving transistor DT, a compensation circuit CC, a light emitting element OLED, and a storage capacitor Cst.

The light emitting element OLED may operate to emit light in accordance with a drive current formed by the driving transistor DT.

The switching transistor ST may perform a switching operation to store a data signal supplied through a data line DL in the storage capacitor Cst as a data voltage, corresponding to a scan signal supplied through a gate line GL.

The driving transistor DT may operate to enable a constant drive current to flow between a power line for the high-level drive voltage EVDD and a power line for the low-level drive voltage EVSS, corresponding to the data voltage stored in the storage capacitor Cst.

The compensation circuit CC is a circuit for compensating a threshold voltage, etc., of the driving transistor DT. The compensation circuit CC may include one or more thin film transistors and a capacitor. The configuration of the compensation circuit CC may be very diverse in accordance with compensation methods.

Although the pixel P shown in FIG. 2 is configured to have, for example, a 2T (transistor) 1C (capacitor) structure including the switching transistor ST, the driving transistor DT, the storage capacitor Cst, and the light emitting element OLED, the pixel P may be diversely configured to have structures of 3T1C, 4T2C, 5T2C, 6T1C, 7T1C, 7T2C, etc., when the compensation circuit CC is added.

The display panel 100 may be implemented as a non-transmissive display panel or a transmissive display panel. The transmissive display panel may be applied to a transparent display apparatus in which an image is displayed on a screen and through which an actual background is visible. The display panel 100 may be implemented as a flexible display panel. The flexible display panel may be implemented as an OLED panel using a plastic substrate.

Each pixel P may be divided into a red pixel, a green pixel, and a blue pixel, for color rendering. Each pixel P may further include a white pixel. Each pixel P may include a pixel circuit.

Touch sensors may be disposed on the display panel 100. Touch input may be sensed using separate touch sensors or may be sensed through pixels P. The touch sensors may be disposed on a screen of the display panel 100 in an on-cell type or an add-on type or may be implemented as in-cell type touch sensors built in the display panel 100.

The controller 200 processes image data RGB input thereto from an outside thereof, to match the size and resolution of the display panel 100, and then supplies the processed image data RGB to the data driving circuit 400. The controller 200 generates a gate control signal GCS and a data control signal DCS using synchronization signals input from the outside thereof, for example, a dot clock signal CLK, a date enable signal DE, a horizontal synchronization signal Hsync, and a vertical synchronization signal Vsync.

The controller 200 supplies the gate control signal GCS to the gate driving circuit 300, thereby controlling an operation timing of the gate driving circuit 300. The controller 200 supplies the data control signal DCS to the data driving circuit 400, thereby controlling an operation timing of the data driving circuit 400. The controller 200 synchronizes operation timings of the gate driving circuit 300 and the data driving circuit 400 using the gate control signal GCS and the data control signal DCS.

The controller 200 may be configured to be coupled with various processors, for example, a microprocessor, a mobile processor, an application processor, etc., in accordance with a device mounted therein.

A host system, which is applied to the controller 200, may be one of a television (TV) system, a set-top box, a navigation system, a personal computer (PC), a home theater system, a mobile appliance, a wearable appliance, and a vehicle system.

The controller 200 may multiply an input frame frequency by i times, thereby controlling the operation timings of the display panel drivers at a frame frequency corresponding to an "input frame frequency×i" Hz (i being a positive integer greater than 0). The input frame frequency is 60 Hz in a national television standards committee (NTSC) system, and is 50 Hz in a phase-alternating line (PAL) system.

The controller 200 may drive each pixel P at various refresh rates. The controller 200 may drive each pixel P in a variable refresh rate (VRR) mode, in other words, to be switched between a first refresh rate and a second refresh rate. For example, the controller 200 may drive each pixel P at various refresh rates by simply varying a rate of a clock signal, generating a synchronization signal, for generation of a horizontal blank or a vertical blank, or driving the gate driving circuit 300 in a mask manner.

The voltage level of the gate control signal GCS output from the controller 200 may be converted into a gate-low voltage VGL/VEL and a gate-high voltage VGH/VEH through a level shifter (not shown), and the gate-low voltage VGL/VEL and the gate-high voltage VGH/VEH may then be supplied to the gate driving circuit 300. The level shifter converts a low-level voltage of the gate control signal GCS into a gate-low voltage VGL, and converts a high-level voltage of the gate control signal GCS into a gate-high voltage VGH. The gate control signal GCS includes a start pulse and a shift clock.

The gate driving circuit 300 supplies a gate signal to each gate line GL in accordance with a gate control signal supplied from the controller 200. The gate driving circuit 300 may be disposed at one side or both sides of the display panel 100 in a gate-in-panel manner.

The gate driving circuit 300 sequentially outputs a gate signal to a plurality of gate lines GL under control of the controller 200. The gate driving circuit 300 may shift the gate signal using a shift register and, as such, may sequentially supply shifted gate signals to the gate lines GL, respectively.

The gate signal may include a scan signal SC and an emission control signal EM in an organic light emitting display apparatus. The scan signal SC includes a scan pulse that swings between a gate-low voltage VGL and a gate-high voltage VGH. The emission control signal EM may include an emission control signal pulse that swings between a gate-low voltage VEL and a gate-high voltage VEH. The scan pulse selects pixels P of a line on which a data voltage Vdata will be written. The emission control signal EM defines an emission time of the pixels P.

The gate driving circuit 300 may include at least one scan driver 310 and an emission control signal driver 320.

The emission control signal driver 320 outputs an emission control signal pulse in response to a start pulse and a shift clock from the controller 200, and sequentially shifts the emission control signal pulse in accordance with the shift clock.

The at least one scan driver 310 outputs a scan pulse in response to the start pulse and the shift clock from the controller 200, and shifts the scan pulse in accordance with a timing of the shift clock.

The data driving circuit 400 converts image data RGB into a data voltage Vdata in accordance with a data control signal DCS supplied from the controller 200, and supplies the data voltage Vdata to the pixels P through the data lines DL.

Although the data driving circuit 400 is shown in FIG. 1 as being disposed in the form of a single data driver at one side of the display panel 100, the number and position thereof are not limited to those shown in FIG. 1. That is, the data driving circuit 400 may be constituted by a plurality of integrated circuits (ICs) and, as such, may be disposed at one side of the display panel 100 in a state of being divided into portions respectively corresponding to the plurality of ICs.

The power supply 500 generates DC power required for driving of the pixel array and the display panel drivers of the display panel 100, using a DC-DC converter. The DC-DC converter may include a charge pump, a regulator, a buck converter, a boost converter, etc.

The power supply 500 may receive a DC input voltage from a host system (not shown), thereby generating DC voltages such as a gate-low voltage VGL/VEL, a gate-high voltage VGH/VEH, a high-level drive voltage EVDD, a low-level drive voltage EVSS, etc.

The gate-low voltage VGL/VEL and the gate-high voltage VGH/VEH are supplied to the level shifter (not shown) and the gate driving circuit 300. The high-level drive voltage EVDD and the low-level drive voltage EVSS are supplied to the pixels P in common.

Figure 3:
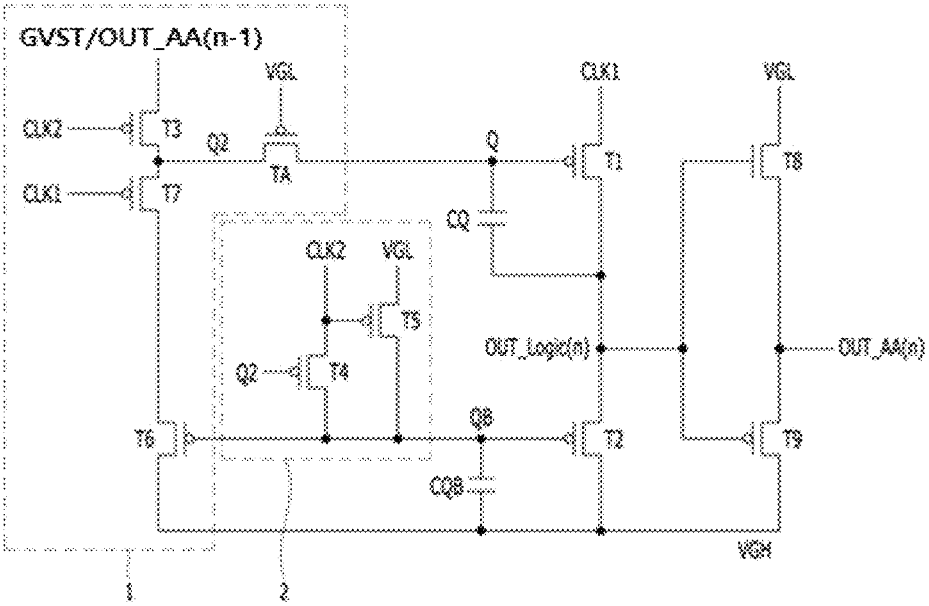
FIG. 3 is a circuit diagram showing a configuration of a scan driver in a gate driving circuit of the display apparatus according to a first embodiment of the present disclosure.

FIG. 3 is a circuit diagram showing a configuration of the scan driver in the gate driving circuit of the display apparatus according to a first embodiment of the present disclosure.

Referring to FIG. 3, the scan driver of the gate driving circuit 300 may include a pull-up transistor T1, a pull-down transistor T2, a transfer transistor TA, a first transistor T3, a second transistor T4, a third transistor T5, a fourth transistor T6, a fifth transistor T7, a first inverter transistor T8, a second inverter transistor T9, a first capacitor CQ, and a second capacitor CQB.

The pull-up transistor T1 may pull-up drive a logic output terminal OUT_logic(n) in response to a signal of a Q-node Q. The pull-down transistor T2 may pull-down drive the logic output terminal OUT_logic(n) in response to a signal of a QB-node QB.

The transfer transistor TA transfers a charge of a Q2-node Q2 to the Q-node Q in response to a gate-low voltage VGL.

The first transistor T3 supplies a start signal GVST or an output signal OUT_AA(n−1) of an upstream stage to the Q2-node Q2 in response to a second clock signal CLK2.

The second transistor T4 supplies the second clock signal CLK2 to the QB-node QB in response to a voltage of the Q2-node Q2.

The third transistor T5 supplies the gate-low voltage VGL to the QB-node QB in response to the second clock signal CLK2.

The fourth transistor T6 supplies a gate-high voltage VGH to the fifth transistor T7 in response to a voltage of the QB-node QB.

The fifth transistor T7 supplies, to the Q2-node Q2, the gate-high voltage VGH supplied through the fourth transistor T6, in response to a first clock signal CLK1.

The first inverter transistor T8 supplies the gate-low voltage VGL to an output terminal OUT_AA(n), to which a gate line is connected, in response to a voltage of the logic output terminal OUT_logic(n).

The second inverter transistor T9 supplies the gate-high voltage VGH to the output terminal OUT_AA(n), to which the gate line is connected, in response to the voltage of the logic output terminal OUT_logic(n).

The first capacitor CQ is coupled between the Q-node Q and the logic output terminal OUT_logic(n). The second capacitor CQB is coupled between the QB-node QB and a gate-high voltage line configured to supply the gate-high voltage VGH.

Here, the pull-up transistor T1, the pull-down transistor T2, the transfer transistor TA, the first transistor T3, the second transistor T4, the third transistor T5, the fourth transistor T6, the fifth transistor T7, the first inverter transistor T8, and the second inverter transistor T9 may be constituted by transistors of different types.

For example, one of the pull-up transistor T1, the pull-down transistor T2, the transfer transistor TA, the first transistor T3, the second transistor T4, the third transistor T5, the fourth transistor T6, the fifth transistor T7, the first inverter transistor T8, and the second inverter transistor T9 may be an oxide transistor including an oxide semiconductor material as an active layer thereof. The oxide semiconductor material exhibits low off-current and, as such, is suitable for a switching transistor maintaining a short turn-on time and a long turn-off time.

In another example, another one of the pull-up transistor T1, the pull-down transistor T2, the transfer transistor TA, the first transistor T3, the second transistor T4, the third transistor T5, the fourth transistor T6, the fifth transistor T7, the first inverter transistor T8, and the second inverter transistor T9 may be a transistor including a low-temperature polysilicon (LTPS) material as an active layer thereof. Such a polysilicon material exhibits high mobility, thereby exhibiting low power consumption and excellent reliability, and, as such, is suitable for a driving transistor DT.

Meanwhile, the pull-up transistor T1, the pull-down transistor T2, the transfer transistor TA, the first transistor T3, the second transistor T4, the third transistor T5, the fourth transistor T6, the fifth transistor T7, the first inverter transistor T8, and the second inverter transistor T9 may be N-type transistors or P-type transistors.

In an N-type transistor, carriers are electrons and, as such, electrons may flow from a source electrode to a drain electrode, and current may flow from the drain electrode to the source electrode. In a P-type transistor, carriers are holes and, as such, holes may flow from a source electrode to a drain electrode, and current may flow from the source electrode to the drain electrode.

For example, one of the pull-up transistor T1, the pull-down transistor T2, the transfer transistor TA, the first transistor T3, the second transistor T4, the third transistor T5, the fourth transistor T6, the fifth transistor T7, the first inverter transistor T8, and the second inverter transistor T9 may be an N-type transistor, and another one of the remaining transistors may be a P-type transistor.

FIG. 3 shows that the pull-up transistor T1, the pull-down transistor T2, the transfer transistor TA, the first transistor T3, the second transistor T4, the third transistor T5, the fourth transistor T6, the fifth transistor T7, and the second inverter transistor T9 are P-type transistors, whereas the first inverter transistor T8 is an N-type transistor.

In addition, the first inverter transistor T8 may be an oxide transistor.

In FIG. 3, the transfer transistor TA, the first transistor T3, the fourth transistor T6 and the fifth transistor T7 may be referred to as a Q-node controller 1 configured to control a voltage of the Q-node Q, and the second transistor T4 and the third transistor T5 may be referred to as a QB node controller 2 configured to control a voltage of the QB-node QB.

Hereinafter, operation of the scan driver of the display apparatus according to the first embodiment of the present disclosure will be described.

Figure 4:
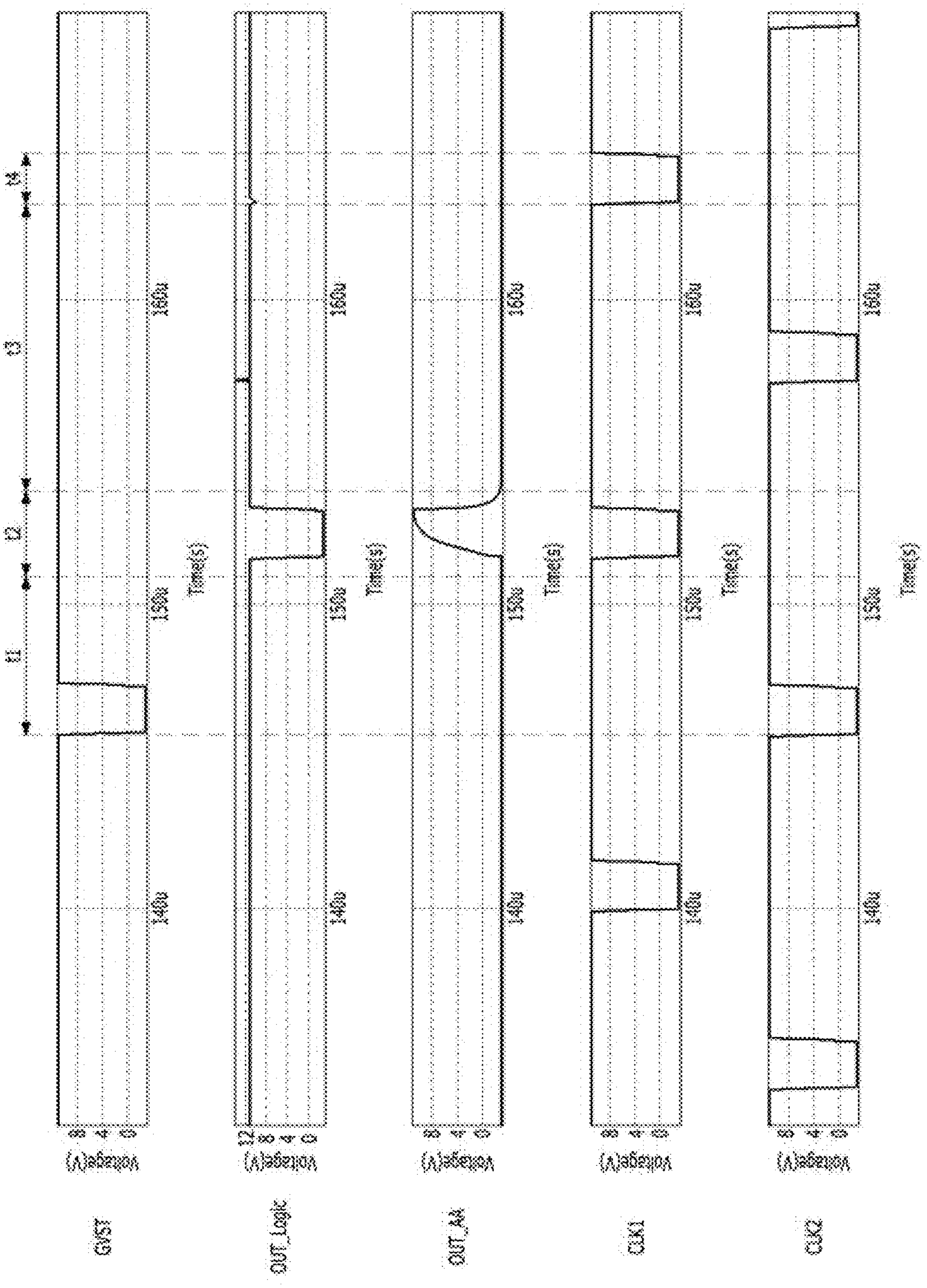
FIG. 4 is a waveform diagram of the scan driver in the gate driving circuit of the display apparatus according to the first embodiment of the present disclosure.

FIG. 4 is a waveform diagram of the scan driver in the gate driving circuit of the display apparatus according to the first embodiment of the present disclosure.

FIGS. 5A to 5D are illustrative circuit diagrams explaining driving methods in periods t1 to t4 of FIG. 4 in the gate driving circuit of the display apparatus according to the first embodiment of the present disclosure, respectively.

Figure 5A:
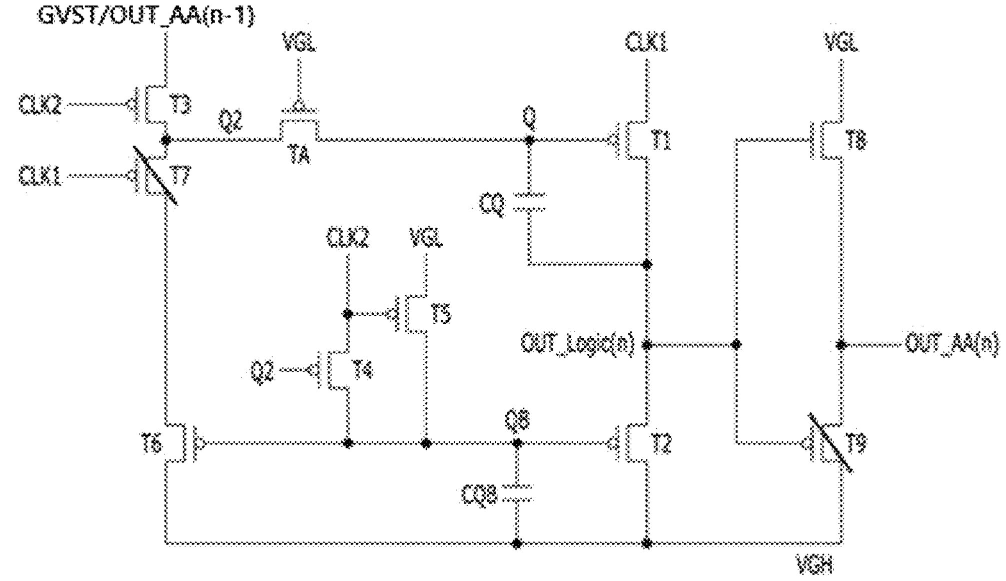
FIGS. 5A to 5D are illustrative circuit diagrams explaining driving methods in periods t1 to t4 of FIG. 4 in the gate driving circuit of the display apparatus according to the first embodiment of the present disclosure, respectively.

As shown in FIGS. 4 and 5A, in a first period t1 in which the start signal GVST or the output signal OUT_AA(n−1) of the upstream stage has a low level, the first clock signal CLK1 has a high level, and the second clock signal CLK2 has a low level, the fifth transistor T7 is turned off, whereas the first transistor T3, the second transistor T4, and the third transistor T5 are turned on.

In this state, the Q2-node Q2 and the Q-node Q maintain a low-level voltage which is the low level of the start signal GVST or the output signal OUT_AA(n−1) of the upstream stage, and the QB-node QB also maintains the gate-low voltage VGL.

Accordingly, the pull-up transistor T1 and the pull-down transistor T2 are turned on and, as such, the logic output terminal OUT_logic(n) outputs the gate-high voltage VGH.

In addition, the first inverter transistor T8 is turned on and the second inverter transistor T9 is turned off by the gate-high voltage VGH of the logic output terminal OUT_logic (n). Accordingly, the output terminal OUT_AA(n) outputs the gate-low voltage VGL.

Figure 5B:
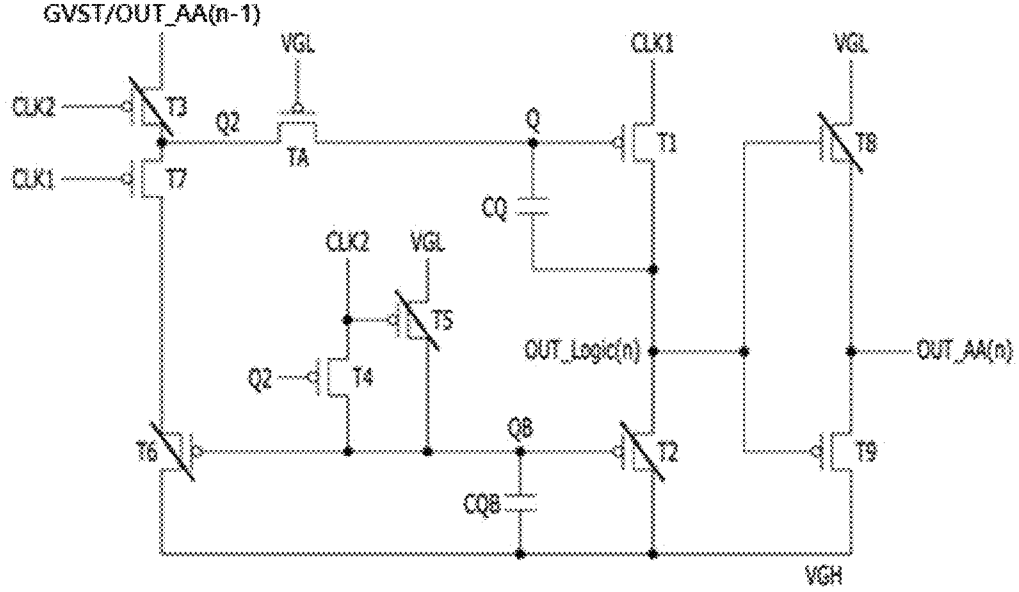

As shown in FIGS. 4 and 5B, in a second period t2 in which the start signal GVST or the output signal OUT_AA (n−1) of the upstream stage transitions from a low level to a high level, the first clock signal CLK1 is output at a low level, and the second clock signal CLK2 is output at a high level, the first transistor T3 and the third transistor T5 are turned off, whereas the second transistor T4 and the fifth transistor T7 are turned on.

In this state, the Q2-node Q2 and the Q-node Q maintain a low-level voltage of the start signal GVST or the output signal OUT_AA(n−1) of the upstream stage, and the QB-node QB maintains a high-level voltage of the second clock signal CLK2.

Accordingly, the pull-up transistor T1 is turned on, and the pull-down transistor T2 and the fourth transistor T6 are turned off, and, as such, the logic output terminal OUT_logic (n) outputs a low-level voltage of the first clock signal CLK1.

In addition, the first inverter transistor T8 is turned off and the second inverter transistor T9 is turned on by the low-level voltage of the first clock signal CLK1 of the logic output terminal OUT_logic(n). Accordingly, the output terminal OUT_AA(n) outputs the gate-high voltage VGH.

Figure 5C:
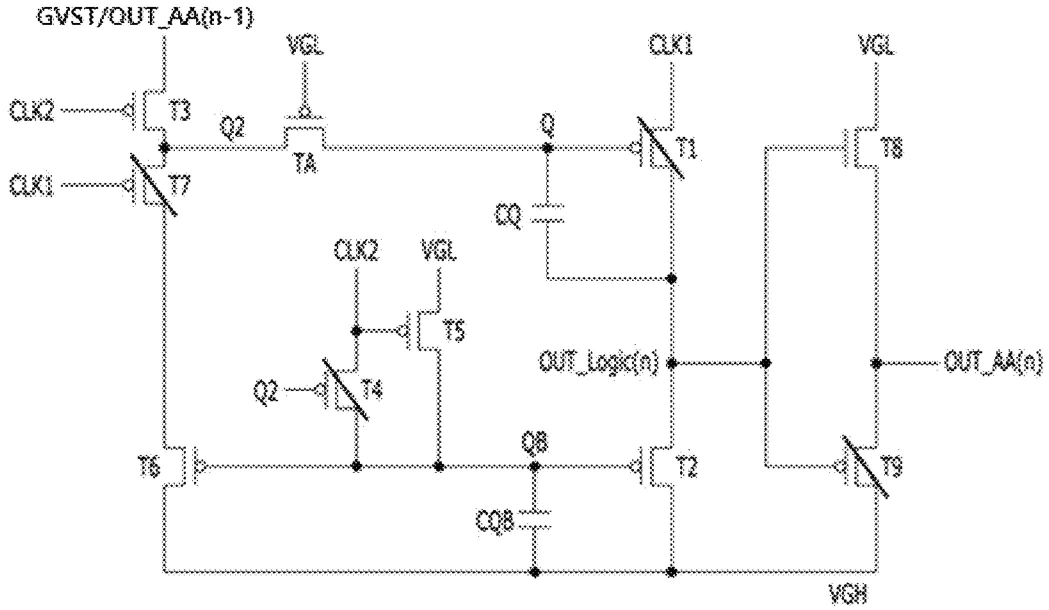

As shown in FIGS. 4 and 5C, in a third period t3 in which the start signal GVST or the output signal OUT_AA(n−1) of the upstream stage has a high level, the first clock signal CLK1 is output at a high level, and the second clock signal CLK2 is output at a low level, whereas the first transistor T3 and the third transistor T5 are turned on. As a result, voltages of the Q2-node Q2 and the Q-node Q are changed into a high-level voltage of the start signal GVST or the output signal OUT_AA(n−1) of the upstream stage, and a voltage of the QB-node QB is changed into the gate-low voltage VGL.

Accordingly, the pull-up transistor T1 is turned off, and the pull-down transistor T2 and the fourth transistor T6 are turned on, and, as such, the logic output terminal OUT_logic (n) outputs the gate-high voltage VGH.

In addition, the first inverter transistor T8 is turned on and the second inverter transistor T9 is turned off by the gate-high voltage VGH of the logic output terminal OUT_logic (n). Accordingly, the output terminal OUT_AA(n) outputs the gate-low voltage VGL.

Figure 5D:
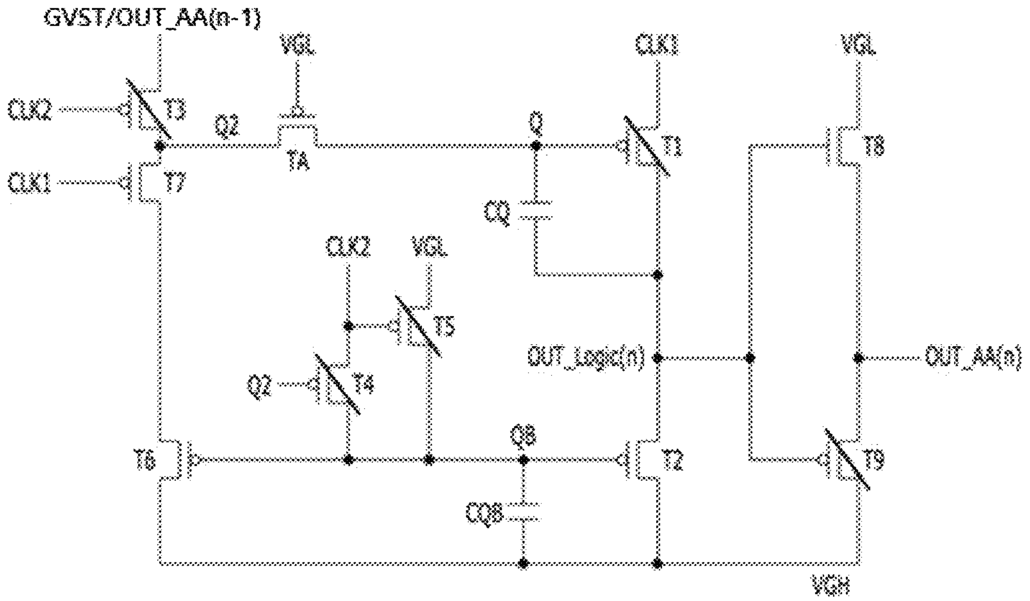

As shown in FIGS. 4 and 5D, in a fourth period t4 in which the start signal GVST or the output signal OUT_AA (n−1) of the upstream stage has a high level, the first clock signal CLK1 is output at a low level, and the second clock signal CLK2 is output at a high level, the first transistor T3, the second transistor T4, and the third transistor T5 are turned off, whereas the fifth transistor T7 is turned on. In this state, the Q2-node Q2 and the Q-node Q maintain the high-level voltage of the start signal GVST or the output signal OUT_AA(n−1) of the upstream stage, and the QB-node QB maintains the gate-low voltage VGL.

Accordingly, the pull-up transistor T1 is turned off, and the pull-down transistor T2 and the fourth transistor T6 are turned on, and, as such, the logic output terminal OUT_logic (n) outputs the gate-high voltage VGH.

In addition, the first inverter transistor T8 is turned on and the second inverter transistor T9 is turned off by the gate-high voltage VGH of the logic output terminal OUT_logic (n). Accordingly, the output terminal OUT_AA(n) maintains the gate-low voltage VGL.

As described above, the scan driver of the display apparatus according to the first embodiment of the present disclosure outputs a scan signal to the output terminal OUT_AA(n) through operation of the first inverter transistor T8 and the second inverter transistor T9 (*t*2), and the first inverter transistor T8 maintains a turn-on state until a next frame starts (t3-t4-t1), after outputting of the scan signal.

Accordingly, the first inverter transistor T8 may undergo positive bias temperature stress (PBTS).

Figure 6:
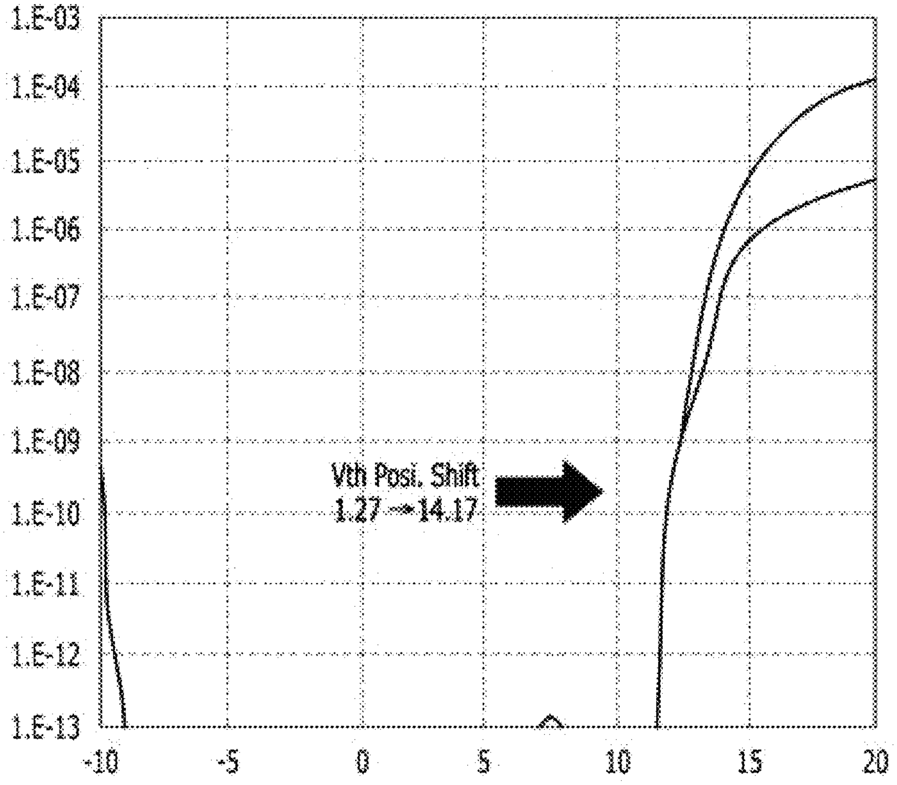
FIG. 6 is a graph depicting results of measurement for a threshold voltage of an oxide transistor after the oxide transistor is driven for long time at a high temperature.

FIG. 6 is a graph depicting results of measurement for a threshold voltage of an oxide transistor after the oxide transistor is driven for long time at a high temperature.

As can be seen from FIG. 6, when the oxide transistor is turned on for long time, the threshold voltage thereof may be shifted to a positive (+) level.

When the first inverter transistor T8 undergoes PBTS due to a reason as described above, a turn-on timing of the first inverter transistor T8 may be delayed, and an output slew rate of the resultant scan signal may be degraded. As a result, the resultant scan signal may be distorted.

Therefore, it is necessary to prevent the first inverter transistor T8 from undergoing PBTS.

Figure 7:
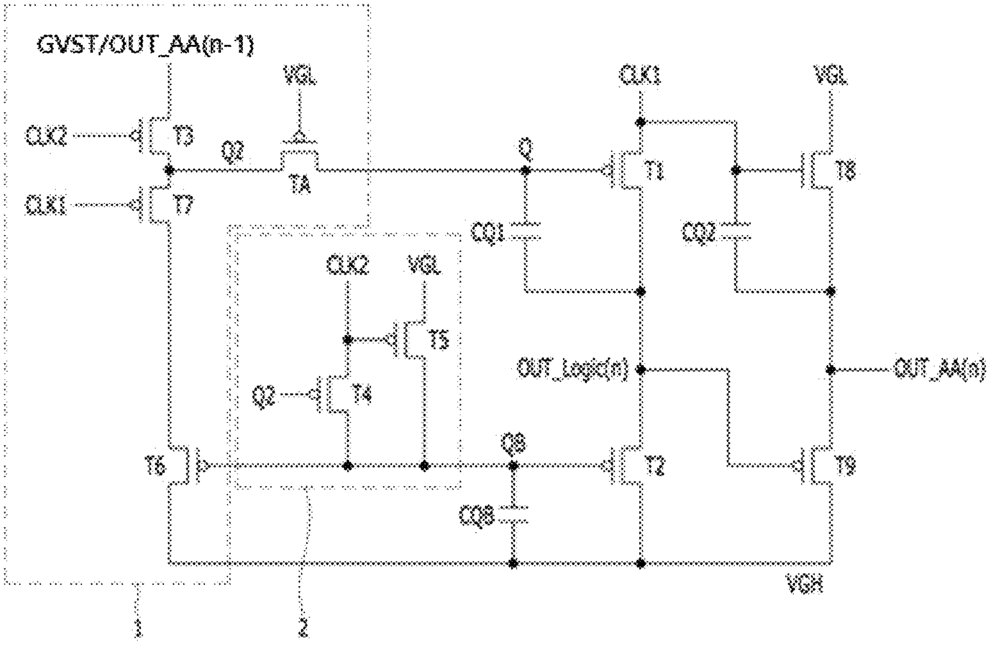
FIG. 7 is a circuit diagram showing a configuration of the scan driver in the gate driving circuit of the display apparatus according to a second embodiment of the present disclosure.

FIG. 7 is a circuit diagram showing a configuration of the scan driver in the gate driving circuit of the display apparatus according to a second embodiment of the present disclosure.

Referring to FIG. 7, the scan driver of the gate driving circuit 300 may include a pull-up transistor T1, a pull-down transistor T2, a transfer transistor TA, a first transistor T3, a second transistor T4, a third transistor T5, the fourth transistor T6, the fifth transistor T7, a first inverter transistor T8, a second inverter transistor T9, a first capacitor CQ1, a second capacitor CQB, and a third capacitor CQ2.

The pull-up transistor T1 may pull-up drive a logic output terminal OUT_logic(n) in response to a signal of a Q-node Q. The pull-down transistor T2 may pull-down drive the logic output terminal OUT_logic(n) in response to a signal of a QB-node QB.

The transfer transistor TA transfers a charge of a Q2-node Q2 to the Q-node Q in response to a gate-low voltage VGL.

The first transistor T3 supplies a start signal GVST or an output signal OUT_AA(n−1) of an upstream stage to the Q2-node Q2 in response to a second clock signal CLK2.

The second transistor T4 supplies the second clock signal CLK2 to the QB-node QB in response to a voltage of the Q2-node Q2.

The third transistor T5 supplies the gate-low voltage VGL to the QB-node QB in response to the second clock signal CLK2.

The fourth transistor T6 supplies a gate-high voltage VGH to the fifth transistor T7 in response to a voltage of the QB-node QB.

The fifth transistor T7 supplies, to the Q2-node Q2, the gate-high voltage VGH supplied through the fourth transistor T6, in response to a first clock signal CLK1.

The first inverter transistor T8 supplies the gate-low voltage VGL to an output terminal OUT_AA(n), to which a gate line is connected, in response to the first clock signal CLK1.

The second inverter transistor T9 supplies the gate-high voltage VGH to the output terminal OUT_AA(n), to which the gate line is connected, in response to a voltage of the logic output terminal OUT_logic(n).

The first capacitor CQ1 is coupled between the Q-node Q and the logic output terminal OUT_logic(n). The second capacitor CQB is coupled between the QB-node QB and a gate-high voltage line configured to supply the gate-high voltage VGH. The third capacitor CQ2 is coupled between a gate of the first inverter transistor T8 and the output terminal OUT_AA(n).

Here, the pull-up transistor T1, the pull-down transistor T2, the transfer transistor TA, the first transistor T3, the second transistor T4, the third transistor T5, the fourth transistor T6, the fifth transistor T7, the first inverter transistor T8, and the second inverter transistor T9 may be constituted by transistors of different types.

For example, one of the pull-up transistor T1, the pull-down transistor T2, the transfer transistor TA, the first transistor T3, the second transistor T4, the third transistor T5, the fourth transistor T6, the fifth transistor T7, the first inverter transistor T8, and the second inverter transistor T9 may be an oxide transistor including an oxide semiconductor material as an active layer thereof. The oxide semiconductor material exhibits low off-current and, as such, is suitable for a switching transistor maintaining a short turn-on time and a long turn-off time.

In another example, another one of the pull-up transistor T1, the pull-down transistor T2, the transfer transistor TA, the first transistor T3, the second transistor T4, the third transistor T5, the fourth transistor T6, the fifth transistor T7, the first inverter transistor T8, and the second inverter transistor T9 may be a transistor including a low-temperature polysilicon (LTPS) material as an active layer thereof. Such a polysilicon material exhibits high mobility, thereby exhibiting low power consumption and excellent reliability, and, as such, is suitable for a driving transistor DT.

Meanwhile, the pull-up transistor T1, the pull-down transistor T2, the transfer transistor TA, the first transistor T3, the second transistor T4, the third transistor T5, the fourth transistor T6, the fifth transistor T7, the first inverter transistor T8, and the second inverter transistor T9 may be N-type transistors or P-type transistors.

In an N-type transistor, carriers are electrons and, as such, electrons may flow from a source electrode to a drain electrode, and current may flow from the drain electrode to the source electrode. In a P-type transistor, carriers are holes and, as such, holes may flow from a source electrode to a drain electrode, and current may flow from the source electrode to the drain electrode.

FIG. 7 shows that all of the pull-up transistor T1, the pull-down transistor T2, the transfer transistor TA, the first transistor T3, the second transistor T4, the third transistor T5, the fourth transistor T6, the fifth transistor T7, and the second inverter transistor T9 are P-type transistors, whereas the first inverter transistor T8 is an N-type transistor.

In addition, the first inverter transistor T8 may be an oxide transistor.

In FIG. 7, the transfer transistor TA, the first transistor T3, the fourth transistor T6, and the fifth transistor T7 may be referred to as a Q-node controller 1 configured to control a voltage of the Q-node Q, and the second transistor T4 and the third transistor T5 may be referred to as a QB node controller 2 configured to control a voltage of the QB-node QB.

Hereinafter, operation of the scan driver of the display apparatus according to the second embodiment of the present disclosure will be described.

Figure 8:
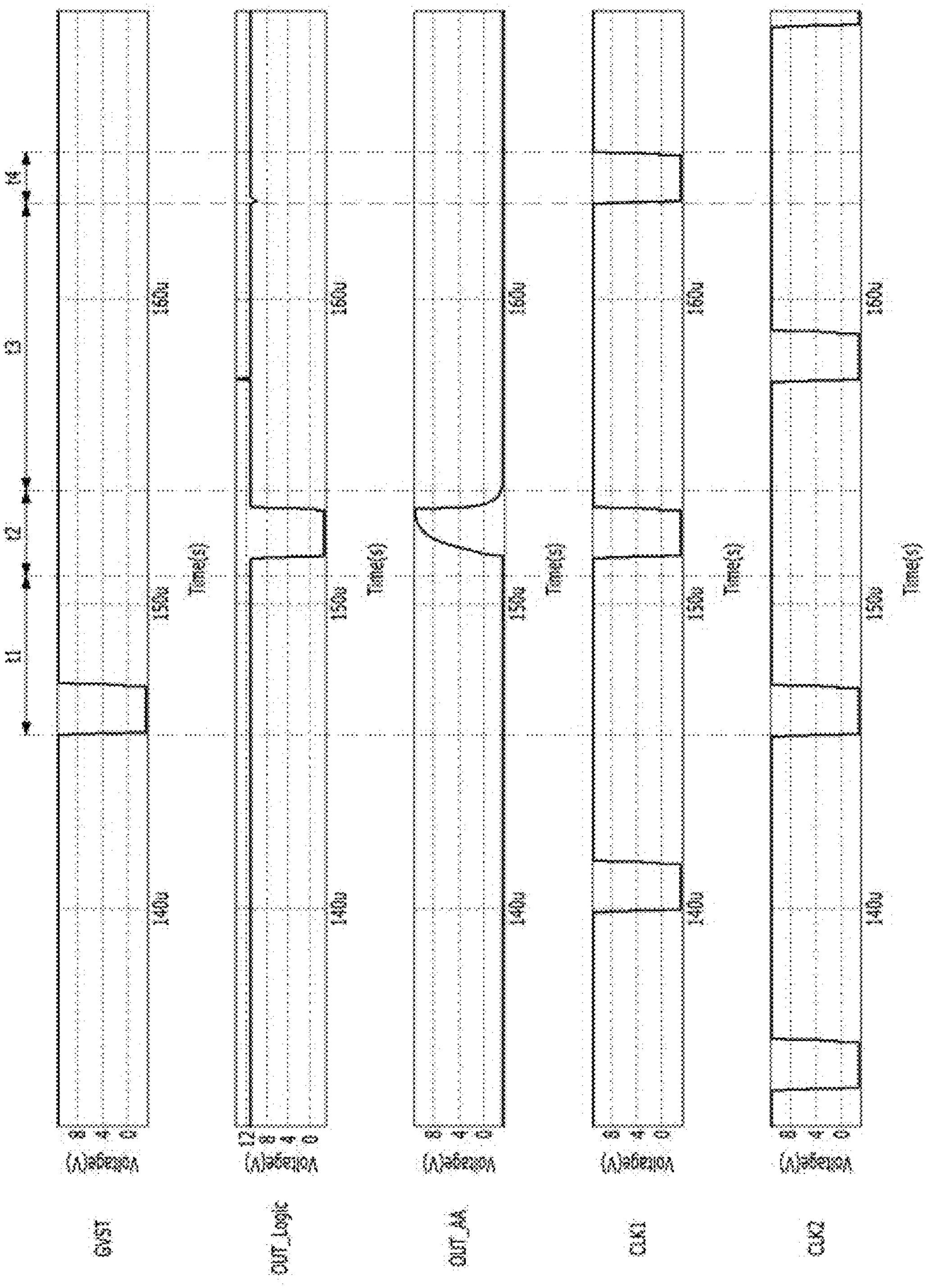
FIG. 8 is a waveform diagram of the scan driver in the gate driving circuit of the display apparatus according to the second embodiment of the present disclosure.

FIG. 8 is a waveform diagram of the scan driver in the gate driving circuit of the display apparatus according to the second embodiment of the present disclosure.

FIGS. 9A to 9D are illustrative circuit diagrams explaining driving methods in periods t1 to t4 of FIG. 8 in the gate driving circuit of the display apparatus according to the second embodiment of the present disclosure, respectively.

Figure 9A:
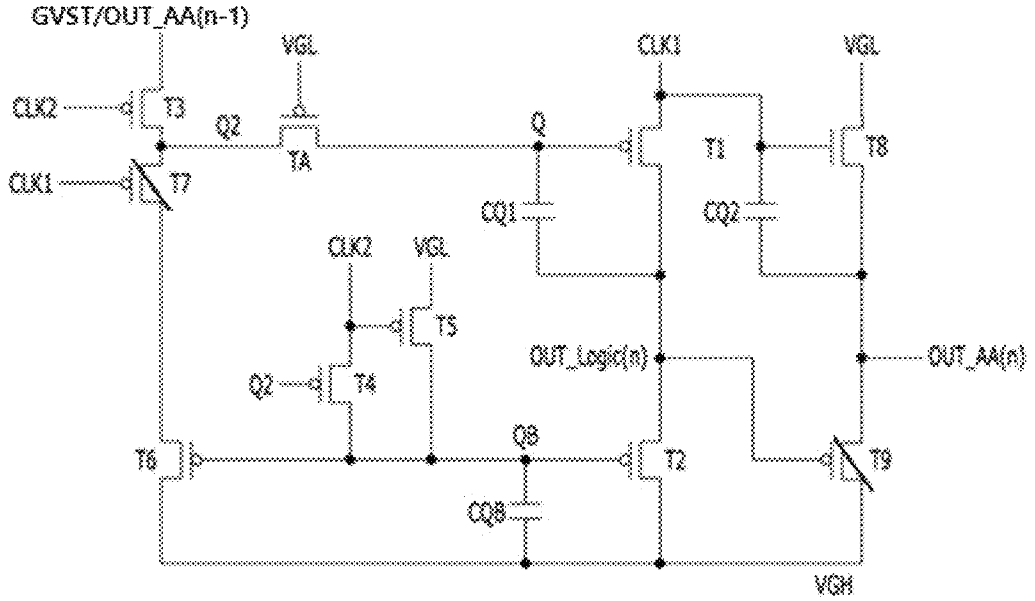
FIGS. 9A to 9D are illustrative circuit diagrams explaining driving methods in periods t1 to t4 of FIG. 8 in the gate driving circuit of the display apparatus according to the second embodiment of the present disclosure, respectively.

As shown in FIGS. 8 and 9A, in a first period t1 in which the start signal GVST or the output signal OUT_AA(n−1) of the upstream stage has a low level, the first clock signal CLK1 has a high level, and the second clock signal CLK2 has a low level, the fifth transistor T7 is turned off, whereas the first transistor T3, the second transistor T4, the third transistor T5, and the first inverter transistor T8 are turned on.

In this state, the Q2-node Q2 and the Q-node Q maintain a low-level voltage which is the low level of the start signal GVST or the output signal OUT_AA(n−1) of the upstream stage, and the QB-node QB also maintains the gate-low voltage VGL.

Accordingly, the pull-up transistor T1 and the pull-down transistor T2 are turned on and, as such, the logic output terminal OUT_logic(n) outputs the gate-high voltage VGH.

In addition, the second inverter transistor T9 is turned off by the gate-high voltage VGH of the logic output terminal OUT_logic(n). Accordingly, the output terminal OUT_AA (n) outputs the gate-low voltage VGL by the first inverter transistor T8 which is in a turn-on state.

Figure 9B:
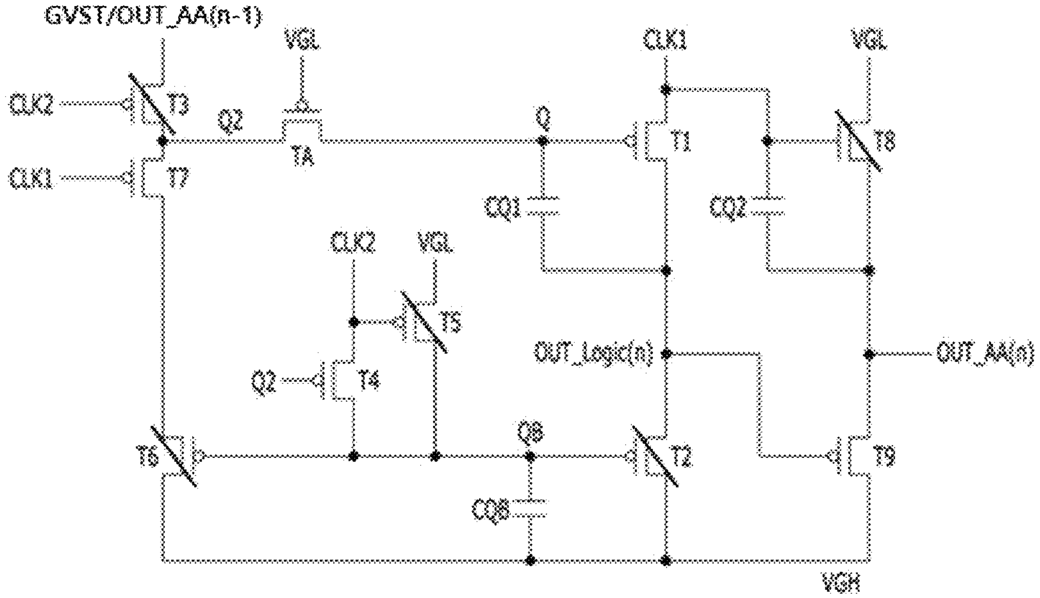

As shown in FIGS. 8 and 9B, in a second period t2 in which the start signal GVST or the output signal OUT_AA (n−1) of the upstream stage transitions from a low level to a high level, the first clock signal CLK1 is output at a low level, and the second clock signal CLK2 is output at a high level, the first transistor T3, the third transistor T5, and the first inverter transistor T8 are turned off, whereas the second transistor T4 and the fifth transistor T7 are turned on.

In this state, the Q2-node Q2 and the Q-node Q maintain a low-level voltage of the start signal GVST or the output signal OUT_AA(n−1) of the upstream stage, and a voltage of the QB-node QB is changed into a high-level voltage of the second clock signal CLK2.

Accordingly, the pull-up transistor T1 is turned on, and the pull-down transistor T2 and the fourth transistor T6 are turned off, and, as such, the logic output terminal OUT_logic (n) outputs a low-level voltage of the first clock signal CLK1.

In addition, the second inverter transistor T9 is turned on by the low-level voltage of the first clock signal CLK1 of the logic output terminal OUT_logic(n). Accordingly, the output terminal OUT_AA(n) outputs the gate-high voltage VGH.

Figure 9C:
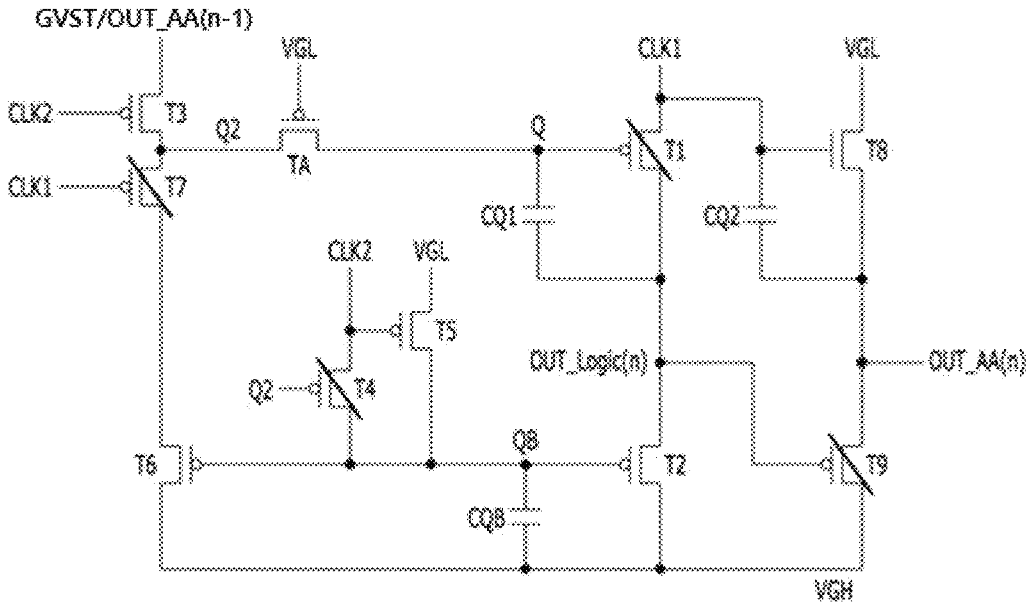

As shown in FIGS. 8 and 9C, in a third period t3 in which the start signal GVST or the output signal OUT_AA(n−1) of the upstream stage has a high level, the first clock signal CLK1 is output at a high level, and the second clock signal CLK2 are output at a low level, the first transistor T3, the third transistor T5, and the first inverter transistor T8 are turned on. As a result, voltages of the Q2-node Q2 and the Q-node Q are changed into a high-level voltage of the start signal GVST or the output signal OUT_AA(n−1) of the upstream stage, and a voltage of the QB-node QB is changed into the gate-low voltage VGL.

Accordingly, the pull-up transistor T1 is turned off, and the pull-down transistor T2 and the fourth transistor T6 are turned on, and, as such, the logic output terminal OUT_logic (n) outputs the gate-high voltage VGH.

In addition, the second inverter transistor T9 is turned off by the gate-high voltage VGH of the logic output terminal OUT_logic(n), and the first inverter transistor T8 is turned on by the first clock signal CLK1. Accordingly, the output terminal OUT_AA(n) outputs the gate-low voltage VGL.

Figure 9D:
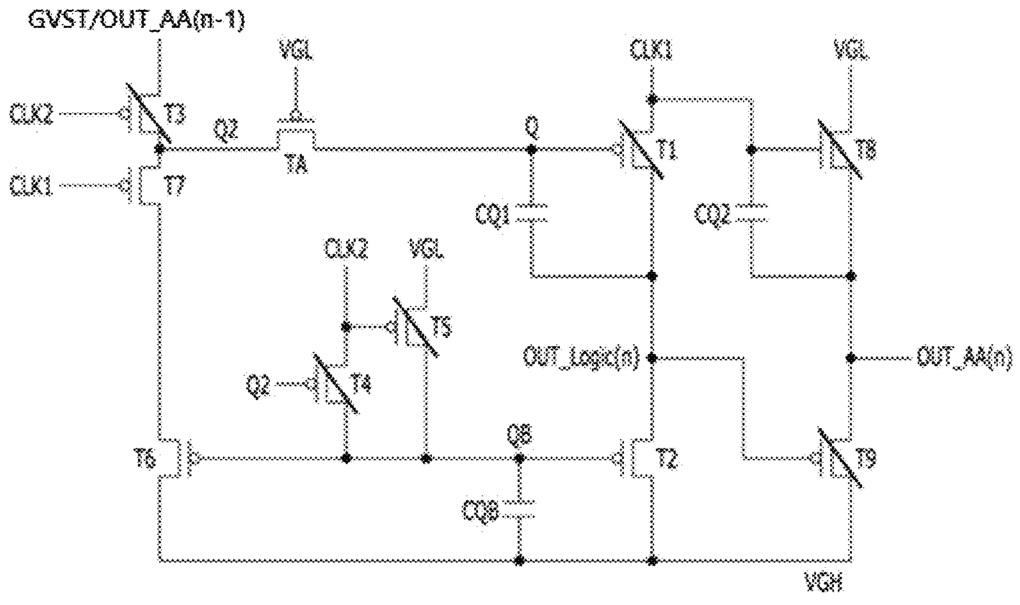

As shown in FIGS. 8 and 9D, in a fourth period t4 in which the start signal GVST or the output signal OUT_AA (n−1) of the upstream stage has a high level, the first clock signal CLK1 is output at a low level, and the second clock signal CLK2 is output at a high level, the first transistor T3, the third transistor T5, and the first inverter transistor T8 are turned off, whereas the fifth transistor T7 is turned on. Accordingly, the Q2-node Q2 and the Q-node Q maintain the high-level voltage of the start signal GVST or the output signal OUT_AA(n−1) of the upstream stage, and the QB-node QB maintains the gate-low voltage VGL.

Accordingly, the pull-up transistor T1 is turned off, and the pull-down transistor T2 and the fourth transistor T6 are turned on, and, as such, the logic output terminal OUT_logic (n) outputs the gate-high voltage VGH.

In addition, the second inverter transistor T9 is turned off by the gate-high voltage VGH of the logic output terminal OUT_logic(n), and the first inverter transistor T8 is turned off by the first clock signal CLK1. Accordingly, the output terminal OUT_AA(n) maintains the gate-low voltage VGL.

As apparent from the above description, the scan driver of the display apparatus according to the second embodiment of the present disclosure outputs a scan signal at the output terminal OUT_AA(n), as described above with reference to FIGS. 8 and 9B.

In the gate driving circuit according to the second embodiment of the present disclosure as described above, the first inverter transistor T8 is maintained in a turn-off state in the fourth period t4 described with reference to FIG. 9D until a next frame starts. Accordingly, the first inverter transistor T8 may not undergo positive bias temperature stress (PBTS).

Since the gate driving circuit according to the second embodiment of the present disclosure is configured such that the first inverter transistor does not undergo PBTS, reliability of the gate driving circuit may be enhanced.

Since the first inverter transistor does not undergo PBTS, it may be possible to reduce a failure rate of the display apparatus. Accordingly, it may be possible to reduce production energy for production of the display apparatus and to reduce generation of greenhouse gases caused by a manufacturing process for the display apparatus. Thus, environment/social/governance (ESG) goals may be achieved.

Gate driving circuits according to various embodiments of the present disclosure may be described as follows.

A gate driving circuit according to an embodiment of the present disclosure may include a Q-node controller configured to control a voltage of a Q-node by first and second clock signals and a start signal or an output signal of an upstream stage, a QB-node controller configured to control a voltage of a QB-node by the second clock signal, a pull-up transistor configured to pull-up drive a logic output terminal in response to the voltage of the Q-node, a pull-down transistor configured to pull-down drive the logic output terminal in response to the voltage of the QB-node, a first inverter transistor configured to supply a gate-low voltage to an output terminal in response to a voltage of the logic output terminal, and a second inverter transistor configured to supply a gate-high voltage to the output terminal in response to the voltage of the logic output terminal.

A gate driving circuit according to another embodiment of the present disclosure may include a Q-node controller configured to control a voltage of a Q-node by first and second clock signals and a start signal or an output signal of an upstream stage, a QB-node controller configured to control a voltage of a QB-node by the second clock signal, a pull-up transistor configured to pull-up drive a logic output terminal in response to the voltage of the Q-node, a pull-down transistor configured to pull-down drive the logic output terminal in response to the voltage of the QB-node, a first inverter transistor configured to supply a gate-low voltage to an output terminal in response to the first clock signal, and a second inverter transistor configured to supply a gate-high voltage to the output terminal in response to a voltage of the logic output terminal.

The Q-node controller may include a first transistor configured to supply the start signal or the output signal of the upstream stage to a Q2-node in response to the second clock signal, a transfer transistor configured to transfer a charge of the Q2-node to the Q-node in response to the gate-low voltage, a fourth transistor configured to supply the gate-high voltage in response to the voltage of the QB-node, and a fifth transistor configured to supply, to the Q2-node, the gate-high voltage supplied through the fourth transistor, in response to the first clock signal.

The QB-node controller may include a second transistor configured to supply the second clock signal to the QB-node in response to a voltage of the Q2-node, and a third transistor configured to supply the gate-low voltage to the QB-node in response to the second clock signal.

The gate driving circuit according to each of the embodiments of the present disclosure may further include a first capacitor coupled between the Q-node and the logic output terminal, and a second capacitor coupled between the QB-node and a gate-high voltage line configured to supply the gate-high voltage.

The gate driving circuit according to each of the embodiments of the present disclosure may further include a third capacitor coupled between a gate of the first inverter transistor and the output terminal.

As apparent from the above description, a gate driving circuit according to the present disclosure and a display apparatus including the same has the following effects.

In a gate driving circuit according to an embodiment of the present disclosure, a first inverter transistor is maintained in a turn-off state in a fourth period t4 until a next frame starts, after outputting a scan signal. Accordingly, the first inverter transistor may not undergo positive bias temperature stress (PBTS).

Since the gate driving circuit according to the embodiment of the present disclosure is configured such that the first inverter transistor does not undergo PBTS, reliability of the gate driving circuit may be enhanced.

Since the first inverter transistor does not undergo PBTS, it may be possible to reduce a failure rate of the display apparatus. Accordingly, it may be possible to reduce production energy for production of the display apparatus and to reduce generation of greenhouse gases caused by a manufacturing process for the display apparatus. Thus, environment/social/governance (ESG) goals may be achieved.

In the descriptions herein, transistors and the operations thereof are described using example types for illustrative purposes. For example, transistors T1, T2, T3, T4, T5, T6, T7, and T9 are illustrated as P-type transistors configured to be turned on using a logic low voltage and be turned off using a logic high voltage. Transistor T8 is illustrated as an N-type transistor configured to be turned on using a logic high voltage and be turned off using a logic low voltage. Such examples do not limit the scope of the disclosure and the transistors can be implemented using different types of transistors, and the circuit configurations can be adapted accordingly without deviating from the concepts of the disclosure, and are included in the scope of the disclosure. For example, transistors T1, T2, T3, T4, T5, T6, T7, and T9 can be implemented by N-type transistors and transistor T8 can be an P-type transistor.

Although some example embodiments of the present disclosure have been disclosed for illustrative purposes, those skilled in the art will appreciate that various modifications, additions and substitutions are possible, without departing from the scope and spirit of the disclosure as disclosed in the accompanying claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gate driving circuit comprising:

a Q-node controller configured to control a voltage of a Q-node by first and second clock signals and a start signal or an output signal of an upstream stage;

a QB-node controller configured to control a voltage of a QB-node by the second clock signal;

a pull-up transistor configured to pull-up drive a logic output terminal in response to the voltage of the Q-node;

a pull-down transistor configured to pull-down drive the logic output terminal in response to the voltage of the QB-node;

a first inverter transistor configured to supply a gate-low voltage to an output terminal in response to a voltage of the logic output terminal; and a second inverter transistor configured to supply a gate-high voltage to the output terminal in response to the voltage of the logic output terminal.

2. The gate driving circuit according to claim 1, wherein the Q-node controller comprises:

a first transistor configured to supply the start signal or the output signal of the upstream stage to a Q2-node in response to the second clock signal;

a transfer transistor configured to transfer a charge of the Q2-node to the Q-node in response to the gate-low voltage;

a second transistor configured to supply the gate-high voltage in response to the voltage of the QB-node; and a third transistor configured to supply, to the Q2-node, the gate-high voltage supplied through the third transistor, in response to the first clock signal.

3. The gate driving circuit according to claim 2, wherein the QB-node controller comprises:

a fourth transistor configured to supply the second clock signal to the QB-node in response to a voltage of the Q2-node; and a fifth transistor configured to supply the gate-low voltage to the QB-node in response to the second clock signal.

4. The gate driving circuit according to claim 1, further comprising:

a first capacitor coupled between the Q-node and the logic output terminal;

a second capacitor coupled between the QB-node and a gate-high voltage line configured to supply the gate-high voltage.

5. A gate driving circuit comprising:

a Q-node controller configured to control a voltage of a Q-node by first and second clock signals and a start signal or an output signal of an upstream stage;

a QB-node controller configured to control a voltage of a QB-node by the second clock signal;

a pull-up transistor configured to pull-up drive a logic output terminal in response to the voltage of the Q-node;

a pull-down transistor configured to pull-down drive the logic output terminal in response to the voltage of the QB-node;

a first inverter transistor configured to supply a gate-low voltage to an output terminal in response to the first clock signal; and a second inverter transistor configured to supply a gate-high voltage to the output terminal in response to a voltage of the logic output terminal.

6. The gate driving circuit according to claim 5, wherein the Q-node controller comprises:

a first transistor configured to supply the start signal or the output signal of the upstream stage to a Q2-node in response to the second clock signal;

a transfer transistor configured to transfer a charge of the Q2-node to the Q-node in response to the gate-low voltage;

a second transistor configured to supply the gate-high voltage in response to the voltage of the QB-node; and a third transistor configured to supply, to the Q2-node, the gate-high voltage supplied through the third transistor, in response to the first clock signal.

7. The gate driving circuit according to claim 6, wherein the QB-node controller comprises:

a fourth transistor configured to supply the second clock signal to the QB-node in response to a voltage of the Q2-node; and a fifth transistor configured to supply the gate-low voltage to the QB-node in response to the second clock signal.

8. The gate driving circuit according to claim 5, further comprising:

a first capacitor coupled between the Q-node and the logic output terminal;

a second capacitor coupled between the QB-node and a gate-high voltage line configured to supply the gate-high voltage; and a third capacitor coupled between a gate of the first inverter transistor and the output terminal.

9. A display apparatus comprising:

a display panel comprising a plurality of data lines, a plurality of gate lines, and a plurality of pixels disposed thereon;

a gate driving circuit according to claim 5, the gate driving circuit being configured to supply a scan signal and an emission control signal to the plurality of gate lines;

a data driving circuit configured to supply a data signal to the plurality of data lines; and a controller configured to control operation timings of the gate driving circuit and the data driving circuit.

10. A gate driving circuit comprising:

a first transistor coupled between a first clock line of a first clock signal and a logic output terminal, a gate of the first transistor coupled to a Q2 node;

a second transistor coupled between the logic output terminal and a first voltage line of a first voltage signal having a first logic value, a gate of the second transistor coupled to a second clock line of a second clock signal via a third transistor and coupled to a second voltage line of a second voltage signal having a second logic value via a fourth transistor, a gate of the third transistor coupled to the Q2 node, and a gate of the fourth transistor coupled to the second clock line of the second clock signal, a first inverter transistor coupled between the second voltage line of the second voltage signal and an output terminal; and a second inverter transistor coupled between the first voltage line of the first voltage signal and the output terminal, the second inverter transistor being a different N type or P type of transistor from the first inverter transistor.

11. The gate driving circuit of claim 10, wherein the first clock signal and the second clock signal are configured to have opposite logic levels to one another.

12. The gate driving circuit of claim 11, wherein a gate of the second inverter transistor is coupled to the logic output terminal.

13. The gate driving circuit of claim 12, wherein a gate of the first inverter transistor is coupled to the logic output terminal.

14. The gate driving circuit of claim 12, wherein a gate of the first inverter transistor is coupled to the first clock line of the first clock signal.

15. The gate driving circuit of claim 14, further comprising a capacitor coupled between the gate of the first inverter transistor and the output terminal.

16. The gate driving circuit of claim 10, further comprising a capacitor coupled between the gate of the first transistor and the logic output terminal.

17. The gate driving circuit of claim 10, further comprising a capacitor coupled between the gate of the second transistor and the first voltage line of the first voltage signal.

18. The gate driving circuit of claim 10, further comprising a fifth transistor and a sixth transistor coupled in series between the first voltage line of the first voltage signal and the Q2 node, a gate of the fifth transistor coupled to the gate of the second transistor, and a gate of the sixth transistor coupled to the first clock line of the first clock signal.

19. The gate driving circuit of claim 10, further comprising a seventh transistor coupled between the Q2 node and an input terminal configured to receive one of a start signal or an output signal of an upstream stage.

* * * * *